United States Patent [19]
Todokoro et al.

[11] Patent Number: 5,501,601
[45] Date of Patent: Mar. 26, 1996

[54] EDUCATIONAL DRAWING TOY WITH SOUND-GENERATING FUNCTION

[75] Inventors: Masatoshi Todokoro, Matsudo; Masami Shiraishi, Tiba, both of Japan

[73] Assignees: Stuff Co., Ltd.; Works Co., Ltd., both of Tokyo, Japan

[21] Appl. No.: 260,385

[22] Filed: Jun. 14, 1994

[30] Foreign Application Priority Data

Jun. 15, 1993 [JP] Japan ................................ 5-039909 U

[51] Int. Cl.⁶ ........................................ G09B 5/00
[52] U.S. Cl. ........................ 434/169; 434/162; 434/163; 434/164; 434/308; 446/146; 446/397
[58] Field of Search ...................... 434/156, 157, 434/159–166, 308, 309, 311–313, 317–319, 321, 322, 327, 334–336, 338–340, 365, 379, 408, 410, 416, 428, 430; 446/146, 397

[56] References Cited

U.S. PATENT DOCUMENTS 3,673,708  4/1972  Bevens ................................ 434/164
3,690,020  9/1972  McBratnie ........................... 434/163
4,740,161  4/1988  Schwartz et al. .................... 434/162
5,356,296  10/1994 Pierce et al. ........................ 434/317

FOREIGN PATENT DOCUMENTS 2248322  4/1974  Germany .............................. 434/162

Primary Examiner—Richard J. Apley
Assistant Examiner—Glenn E. Richman
Attorney, Agent, or Firm—Oblon, Spivak, McClelland, Maier & Neustadt

[57] ABSTRACT

An educational drawing toy with sound-generating function has a resilient whiteboard, plural sets of contacts arranged in the form of a matrix underneath the resilient whiteboard, and a sound-generating circuit electrically connected to the plural sets of contacts. Under the action of pen pressures applied upon drawing a picture on the whiteboard, the plural sets of contacts are selectively and successively brought into contact with each other to actuate the sound-generating circuit so that a scale or plural melodies can be selectively played.

7 Claims, 2 Drawing Sheets

5,501,601

EDUCATIONAL DRAWING TOY WITH SOUND-GENERATING FUNCTION

BACKGROUND OF THE INVENTION

1. Field of the Invention

This invention relates to an educational drawing toy with sound-generating function, and especially to an educational drawing toy with sound-generating function, which upon drawing a picture on a whiteboard, can selectively play a scale, that is, a graduated series of musical tones or sounds or one of plural melodies, can spur an infant's interests and can hence make an infant arouse interests in the scale or melodies. The term "drawing" as used herein should be interpreted in a broader sense so that it may mean to draw a picture or a mark, to write characters or letters or to draw a line or the like.

2. Description of the Related Art

Educational toys with a keyboard or a display portion resembling a keyboard, said educational toys being capable of playing a scale or a melody by means of a sound-producing circuit when the keyboard or display portion is pressed, and expensive educational toys constructed to play a melody by giving key selecting commands in accordance with a preset program have been developed to date.

Such conventional educational toys are effective when used by those having intellectual cognitive faculties raised to certain extents. They can hardly be used by low-age infants. They have to be used in a relatively complex manner so that they tend to become tired or weary. Further, the educational toys themselves are extremely expensive.

BACKGROUND OF THE INVENTION

With the foregoing in view, the present invention has as a primary object the provision of an educational drawing toy with sound-generating function so that a low-age infant can develop interests in scales and/or melodies while drawing pictures.

In one aspect of the present invention, there is thus provided an educational drawing toy with sound-generating function, comprising a resilient whiteboard, plural sets of contacts arranged in the form of a matrix underneath the resilient whiteboard, and a sound-generating circuit electrically connected to the plural sets of contacts, whereby under the action of pen pressures applied upon drawing a picture on the whiteboard, the plural sets of contacts are selectively and successively brought into contact with each other to actuate the sound-generating circuit so that at least one of a scale and a melody can be played.

The plural sets of contacts may consist of a like plural number of contacts printed in the form of the matrix on a stationary printed substrate fixed on a support and a like plural number of contacts printed in the form of the matrix on a resilient printed substrate, the stationary printed substrate and the resilient printed substrate may be arranged with the contacts of the former substrate opposing the corresponding contacts of the latter substrate, a spacer may be interposed between the stationary printed board and the resilient printed board and may define openings at locations corresponding to the sets of the contacts, respectively, and in each opening, a space may normally be maintained between the contacts in the corresponding set.

Since the educational drawing toy according to the present invention is constructed as described above, especially the educational drawing toy allows an infant to selectively listen to a scale or plural melodies while drawing a picture or a line on the whiteboard. It is therefore possible to spur an infant's interests in such a scale or melodies. The infant can therefore enjoy to draw pictures. An infant can therefore be made interests in a scale or a melody The educational drawing toy according to the present invention is therefore effective as an educational toy.

DETAILED DESCRIPTION OF THE INVENTION AND A PREFERRED EMBODIMENT

The whiteboard may present horizontal lines dividing the whiteboard into horizontal sections with sol-fa syllables written, respectively, therein. The sol-fa syllables can ascend in a direction away from a user.

The educational drawing toy may further comprise a plurality of means for detachably holding drawing and erasing instruments adjacent to the whiteboard.

The sound-generating circuit can be designed to play a scale and plural melodies. In this case, the toy is provided with means for selectively playing one of the scale and melodies when a picture is drawn on the whiteboard.

The educational drawing toy may further comprise a transparent plastic sheet showing a picture, a map or the like printed thereon in such a way that when the transparent plastic sheet is placed over the whiteboard and traced under pressure, said at least one of the scale and the melody can be reproduced.

With reference to the accompanying drawings, the educational drawing toy according to the one embodiment of the present invention, which is provided with sound-generating function, will hereinafter be described specifically.

Figure 1:
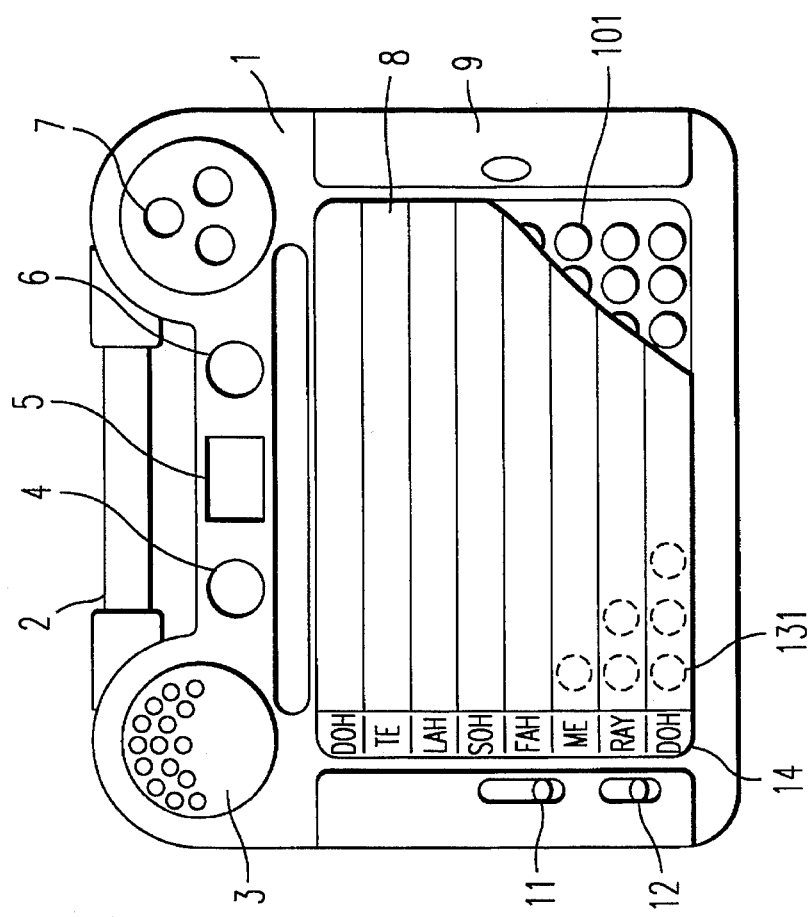
FIG. 1 is a plan view of an educational drawing toy with sound-generating function, which relates to one embodiment of the present invention.
Figure 3:
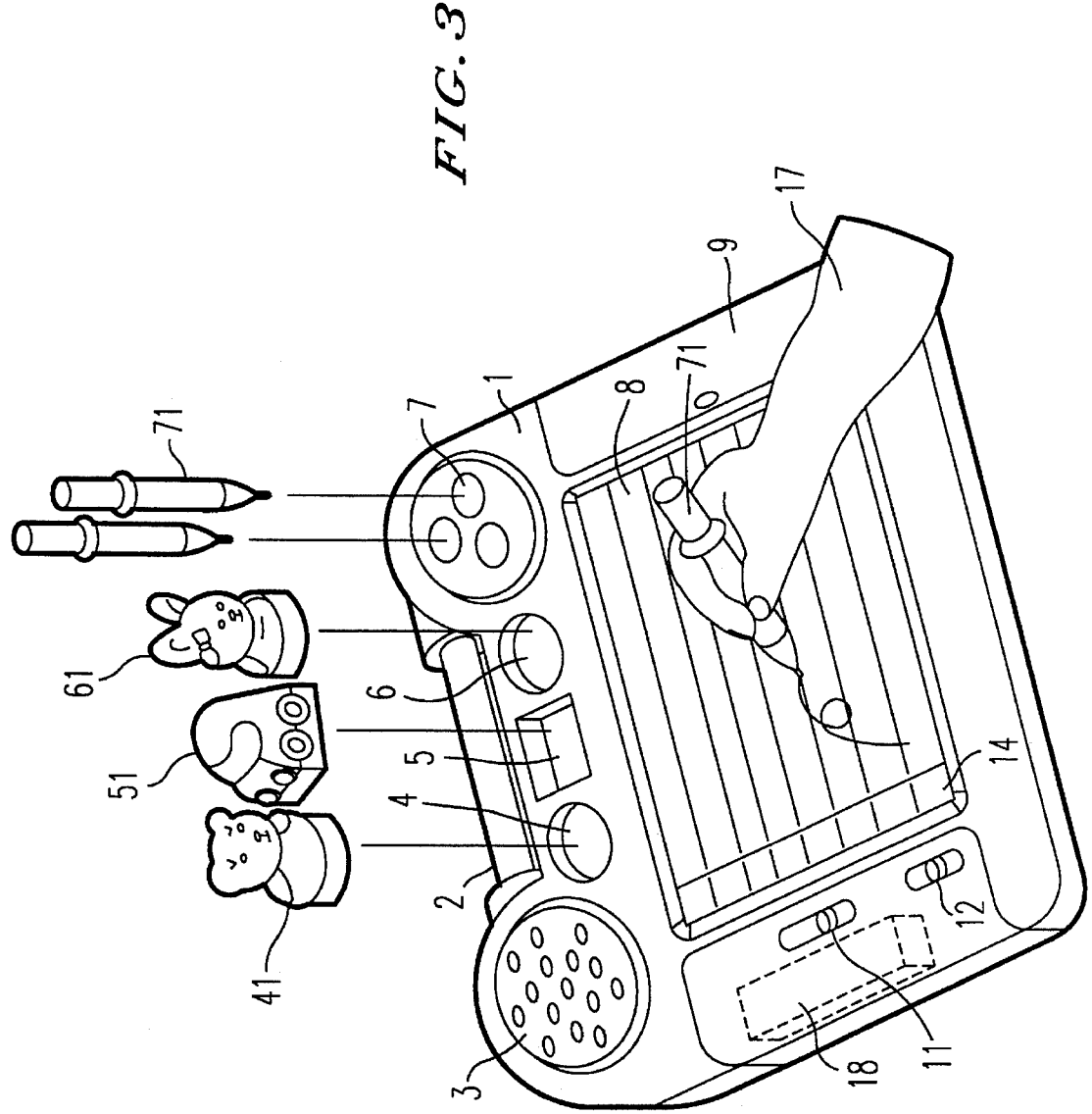
FIG. 3 is a perspective view showing the manner of use of the educational drawing toy.

Reference is first had to FIGS. 1 and 3. Arranged on a top wall of a toy main body 1 are a whiteboard 1 at a central part; a main switch 12 and a mode selector switch 11 on a left-hand side; a pen storage 9 on a right-hand side; and a speaker 3, a tracing pen fitting recess 4, an eraser fitting recess 5, another tracing pen fitting recess 6 and a water-ink pen fitting holes 7 disposed in this order at a front part. Upon using the educational drawing toy, tracing pens 41,61, water-ink pens 71 and an eraser 51 are taken out of a pen storage 9 and are then fitted in the tracing pen fitting recesses 4,6, the water-ink pen fitting holes and the eraser fitting recess 5, respectively.

Figure 2:
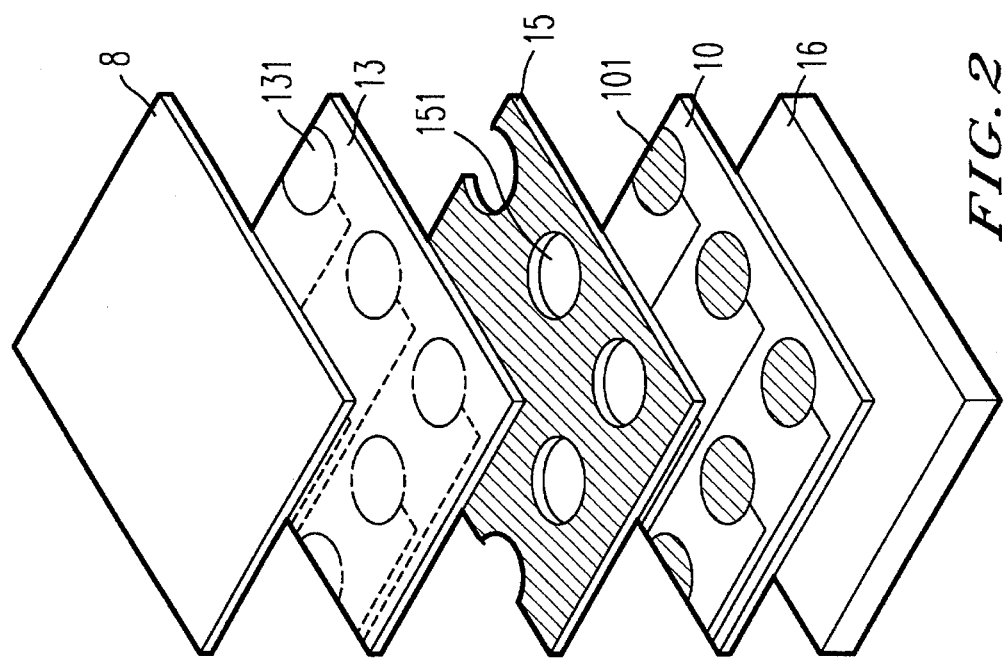
FIG. 2 is a fragmentarily exploded, perspective view of the educational drawing toy.

Referring next to FIG. 2, plural contacts 101 are printed in the form of a matrix on a stationary printed substrate 10 fixed on a support 16 which is accommodated within the toy main body 1. On a resilient printed substrate 13, contacts 131 are printed in the same matrix pattern as the contacts 101. The stationary printed substrate 10 and the resilient printed substrate 13 are arranged with a spacer 15 interposed therebetween so that the contacts 101 and the contacts 131 are located opposite to each other. The spacer 15 defines openings 151 at locations corresponding to the contacts 101,131. In each opening 151, a space is normally maintained between the corresponding contacts 101 and 131.

By a pen pressure applied upon drawing a picture or the like, the space between the contacts 101 and 131 is eliminated so that the contacts 101 and 131 are brought into contact with each other. A current is now allowed to flow through the contacts 101,131. As the picture or the like is drawn on the whiteboard 8, a sound-generating circuit 18 which is arranged within the toy main body 1 and is electrically connected to the individual contacts 101,103 is successively actuated to play a scale or a melody.

The operation of the educational drawing toy will hereinafter be described more specifically with reference to FIG. 3.

Upon using the educational drawing toy, the tracing pens 41,61, the water-ink pens 71 and the eraser 51 are fitted in the tracing pen fitting recesses 4,6, the water-ink pen fitting holes 7 and the eraser fitting recess 5, respectively. The main switch 12 is turned on, and the mode selector switch 11 is set on a "scale" side. When a user begins to draw a picture on the whiteboard 8 by one of the water-ink pens 71 held in a hand 71, a scale is played with its sounds being changed in accordance with a trace so drawn. As is shown in a column 14 with sol-fa syllables (i.e., Doh, Te, Lah, Soh, Fah, Me, Ray, Doh) written therein, the sol-fa sounds ascend successively when a line is drawn upwardly as viewed in FIG. 3, that is, in a direction away from the user. When a line is drawn horizontally within one of the row (for example, the row with the "Soh" syllable written therein) as viewed in FIG. 3, the same sound (for example, "Soh") is continuously produced.

When the mode selector switch 11 is turned to a position corresponding to desired one of the melodies on a "melody" side, the melody so selected is played as a picture is drawn.

Although not illustrated in any of the drawings, a transparent sheet which is made of PVC or the like and shows a picture, a map or the like printed thereon can be placed over the whiteboard 8. The picture, map or the like is designed in such a way that when it is traced under pressure on the whiteboard 8, sol-fa sounds or a melody can be reproduced. When the user place the transparent sheet on the whiteboard 8 and traces the picture, map or the like under pressure by the tracing pen 41 or 61, the sol-fa sounds or the melody can be reproduced precisely.

Irrespective of whether the transparent sheet is used or not, the user erases the drawn picture or the like with the eraser 51, remove the tracing pens 41,61, the water-ink pens 71 and the eraser 51 from the tracing pen fitting recesses 4,6, the water-ink pen fitting holes 7 and the erase fitting recess 5 and then store them in the pen storage 9. The user can now hold the educational drawing toy at a handle 2 and can carry it to any desired place.

In the above embodiment, the sol-fa sounds can be replaced by synthetic sol-fa voices of either ascending or descending tones although the sound-generating circuit may become more expensive. Two or more scales can also be used although only one scale is used in the above embodiment.

Having now fully described the invention, it will be apparent to one of ordinary skill in the art that many changes and modifications can be made thereto without departing from the spirit or scope of the invention as set forth herein.

What is claimed is:

1. An educational drawing toy with sound-generating function, comprising a resilient whiteboard, plural sets of contacts arranged in the form of a matrix underneath the resilient whiteboard, and a sound-generating circuit electrically connected to the plural sets of contacts, wherein under the action of pressure from a pen applied upon drawing a picture on the whiteboard, the plural sets of contacts are selectively and successively brought into contact with each other to actuate the sound-generating circuit so that at least one of a scale and a melody is played as the pen traverses the matrix and in dependence on which sets of contacts in the matrix are brought into contact.

2. The educational drawing toy according to claim 1, wherein the plural sets of contacts consist of a like plural number of contacts printed in the form of the matrix on a stationary printed substrate fixed on a support and a like plural number of contacts printed in the form of the matrix on a resilient printed substrate, the stationary printed substrate and the resilient printed substrate are arranged with the contacts of the former substrate opposing the corresponding contacts of the latter substrate, a spacer is interposed between the stationary printed board and the resilient printed board and defines openings at locations corresponding to the sets of the contacts, respectively, and in each opening, a space is normally maintained between the contacts in the corresponding set.

3. The educational drawing toy according to claim 1, wherein the whiteboard presents horizontal lines dividing the whiteboard into horizontal sections with sol-fa syllables written, respectively, therein.

4. The educational drawing toy according to claim 3, wherein the sol-fa syllables ascend in a direction away from a user.

5. The educational drawing toy according to claim 1, further comprising a plurality of means for detachably holding drawing and erasing instruments adjacent to the whiteboard.

6. The educational drawing toy according to claim 1, wherein the sound-generating circuit is designed to play a scale and plural melodies and the toy is provided with means for selectively playing one of the scale and melodies when a picture is drawn on the whiteboard.

7. The educational drawing toy according to claim 1, further comprising a transparent plastic sheet showing a picture, a map or the like printed in such a way that when the transparent plastic sheet is placed over the whiteboard and traced under pressure, said at least one of the scale and the melody can be reproduced.

\* \* \* \* \*